UNITED STATES PATENT OFFICE.

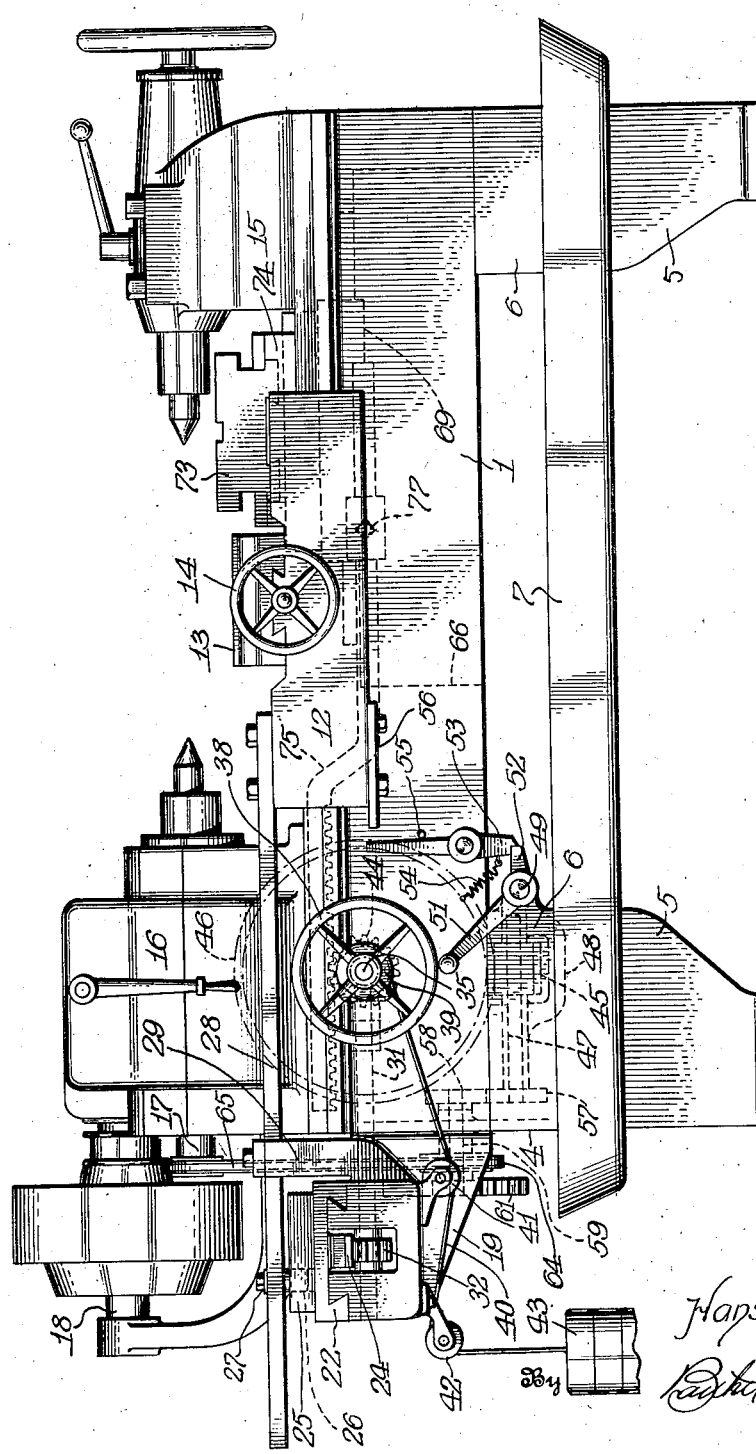

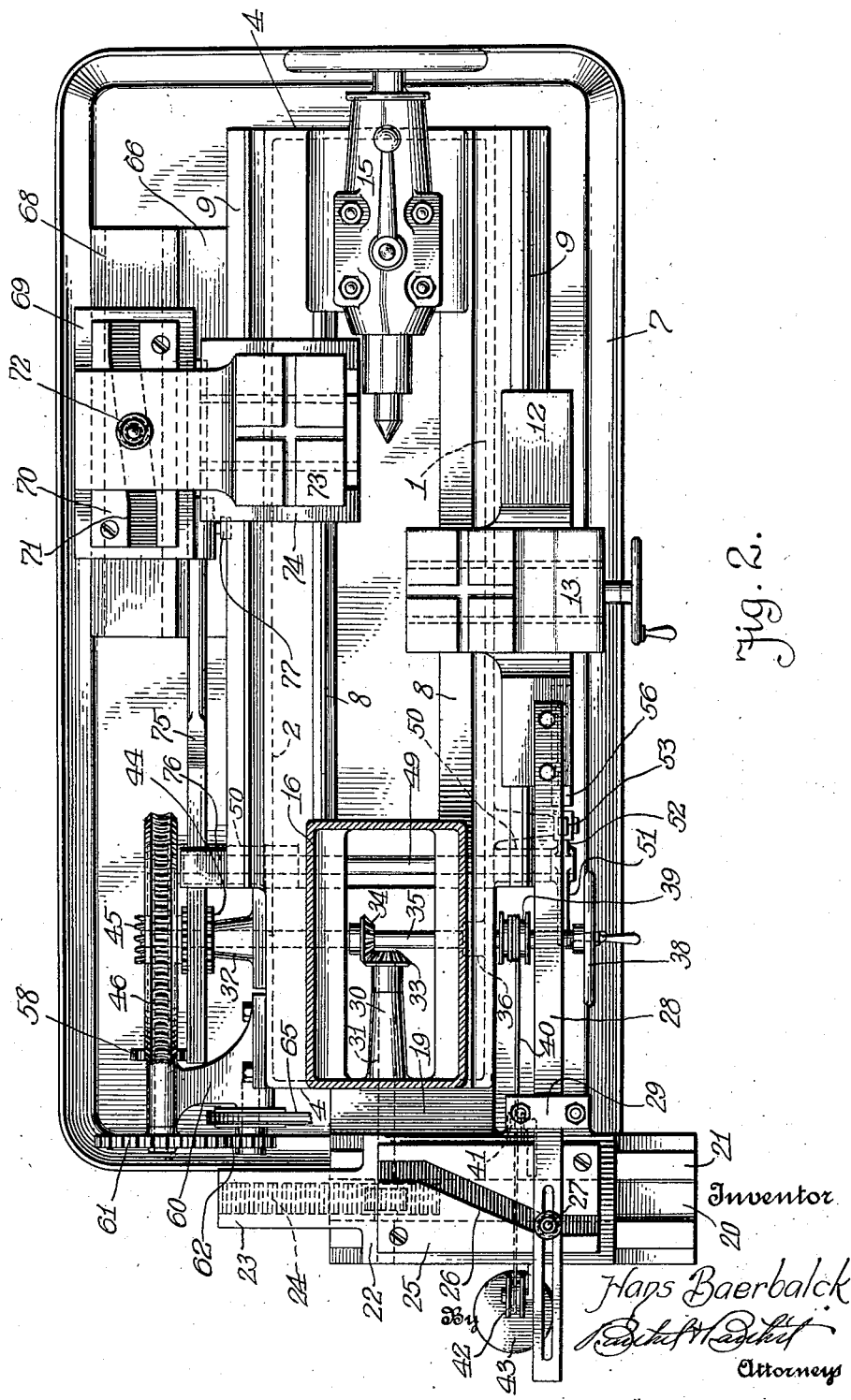

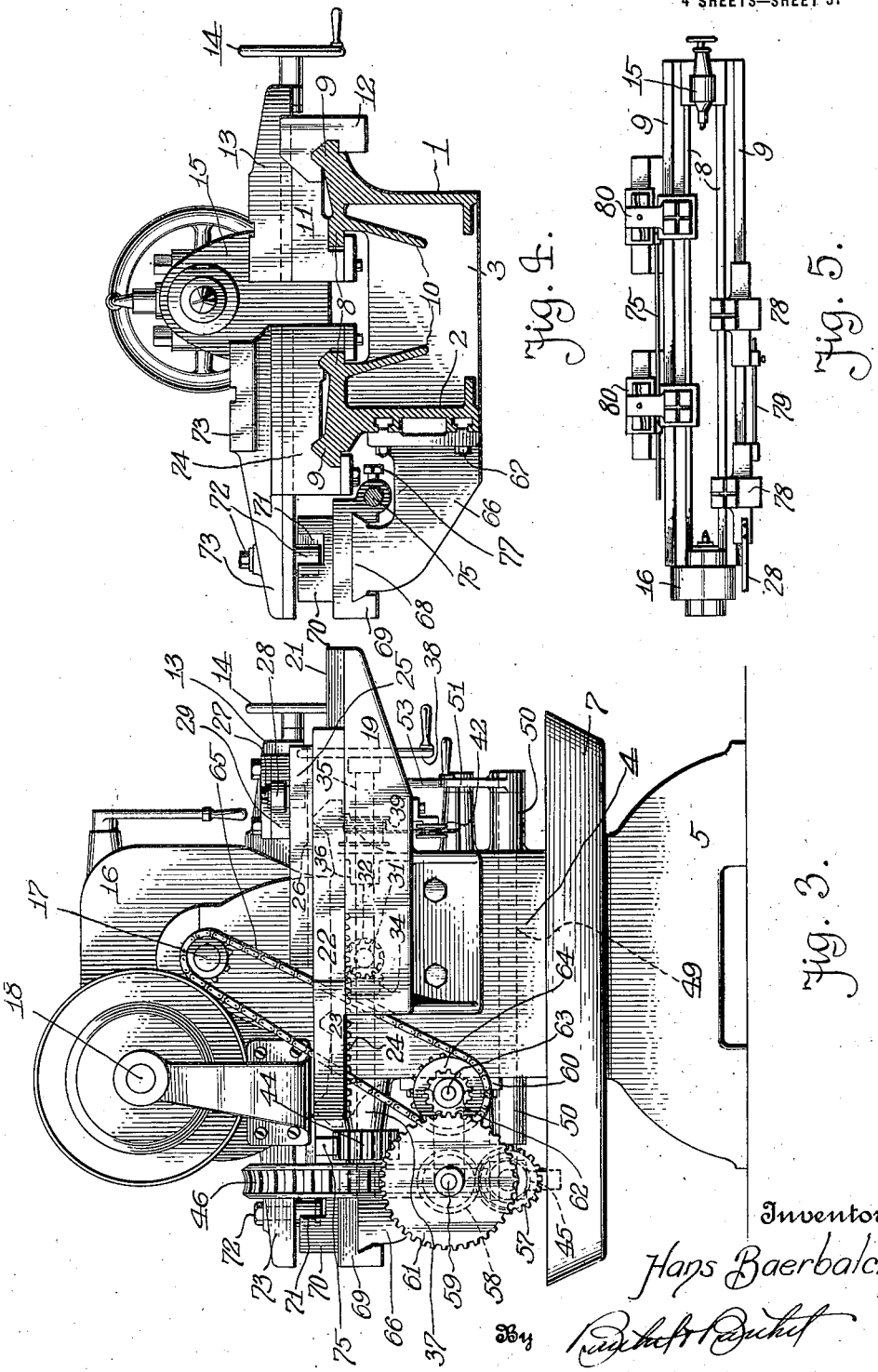

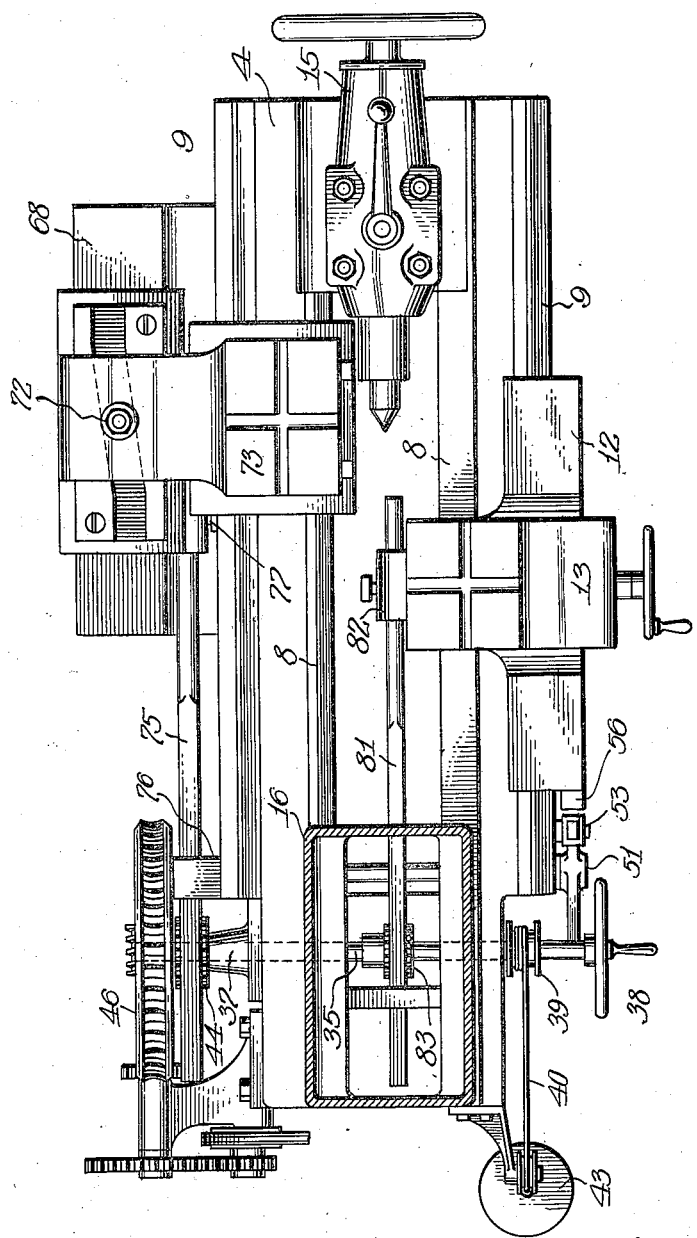

HANS BAERBALCK, OF HAMILTON, OHIO.

LATHE.

1,369,157. Specification of Letters Patent. Patented Feb. 22, 1921.

Application filed April 21, 1919. Serial No. 291,429.

*To all whom it may concern:*

Be it known that I, HANS BAERBALCK, a citizen of Germany, residing at Hamilton, in the county of Butler and State of Ohio, have invented certain new and useful Improvements in Lathes, of which the following is a specification, reference being had therein to the accompanying drawings.

This invention has reference to that type of lathe which permits of metal working operations being simultaneously carried on in two directions or planes at an angle to each other, for instance, operations parallel to the longitudinal axis of a piece of work and operations at a right angle to the axis of a piece of work, thus permitting of metal working operations being expeditiously and economically performed.

My invention aims to provide a double carriage lathe of the above type wherein positive and reliable means are employed, in a manner as hereinafter set forth, for affecting movement of tool holders in synchronism and in different directions, with power utilized for effecting the work operations of the tool holder and gravity utilized for idle movement or restoration of the tool holders to normal or active positions. To this end, the lathe includes a longitudinal movable tool holder and a transverse movable tool holder, the former being characterized by a reciprocatory carriage that is bodily movable with an independent manual tool adjustment transversely thereof; power cam operation for the carriage in one direction and weight actuation for the carriage in an opposite direction; automatic cut off for the power connection and manual restoration of the power connection.

The transverse movable tool holder is characterized by a carriage normally stationary but capable of being adjusted and associated with the carriage is an adjustable bracket having provision for transversely adjusting a tool holder on the carriage by power, and the operating mechanism associated with both tool holders is such that the operator of the lathe can manually control the operation by power.

My invention is further characterized by an exceedingly simple and compact mechanism wherein the parts are constructed with a view of reducing the cost of manufacture, and at the same time retain those features by which safety, durability, and ease of assembling are secured. With these and other ends in view, my invention resides in the novel construction to be hereinafter considered and then claimed, and reference will now be had to the drawings, wherein—

Figure 1 is a front elevation of the lathe;

Fig. 2 is a plan of the same, partly in horizontal section;

Fig. 3 is a view of one end of the lathe;

Fig. 4 is a cross sectional view of the same, looking toward the tail stock end thereof;

Fig. 5 is more or less a diagrammatic plan of a multiple carriage lathe; and

Fig. 6 is a plan of a lathe showing a slight modification of my invention.

The lathe as now constructed and in use comprises an oblong body having a front wall 1, a rear wall 2, and end walls 3 and 4, with the ends of said body supported by legs 5 and 6 connected by a drip pan or trough 7 which also serves to brace said legs and as a tool tray. The upper edge of each of the front and rear walls 1 and 2 has longitudinal ways 8 and 9 with the ways 8 provided with depending waste deflectors 10. The ways 8 and 9 of each wall constitute shears or a bed, somewhat similar to two lathes being disposed side by side.

Considering the longitudinal movable tool holder which is slidable on the ways 8 and 9 of the front wall 1, it comprises a carriage 11 having a front apron 12, said carriage being held against vertical displacement relative to the ways 8 and 9. On the carriage 11 is a transverse adjustable tool holder 13 that may be manually adjusted by a conventional form of mechanism, generally designated 14, and I have referred to the element 13 as a tool holder as it is adapted for supporting a tool post, clamp and other instrumentalities by which a cutter, bit or other tool may be operatively held relative to a piece of work in the lathe. For holding a piece of work the lathe has a conventional form of tail stock 15 and a conventional form of head stock 16, said head stock including a main spindle 17 which is adapted to be driven at variable speeds from a suitably driven power shaft 18. Variable speeds may be obtained by any ordinary change speed gear mechanism located within the head stock 16 and adjusted by the operator of the lathe.

The end wall 4 of the lathe body supports a bracket 19 having the upper face thereof provided with a longitudinal groove 20 and ways or a dove tailed tongue 21 for a slide member 22, said slide member inclosing the greater part of the groove 20 and having a rearward extension 23 which coöperates with the slide member in supporting a rack 24 protruding into the groove 20 of the bracket.

On the slide member 22 is an interexchangeable cam member 25 provided with a cam groove 26 and extending into said groove is an anti-frictional roller carried by a post 27 adjustable in the slotted outer end of a longitudinal carriage arm 28 suitably connected to one end of the carriage 11. The carriage arm 28 is slidable in a guide 29 carried by the bracket 19 and through the medium of the slotted carriage arm and the post 27, it is possible to adjust the position of the carriage relative to the cam member 25. With the anti-frictional roller of the post 27 extending into the groove 26 of the cam member 25 it is possible to reciprocate the cam member on the bracket 19 and obtain a longitudinal reciprocatory movement of the carriage 11 on the front wall of the lathe body. To do this a novel power transmission mechanism is employed which, when not power operated, may be automatically actuated by a weight spring, or similar device.

The end wall 4 of the lathe body has a longitudinal bearing 30 for a shaft 31 which extends transversely of the groove 20 in the bracket 19 and is provided with a pinion 32 meshing with the rack 24 of the slide member 22. On the opposite end of the shaft 31 is a beveled gear wheel 33 meshing with a similar wheel 34 mounted on a transverse shaft 35, journaled in bearings 36 and 37 of the walls 1 and 2 respectively.

On the front end of the shaft 35 is a hand wheel 38 by which said shaft may be manually rotated, and mounted on said shaft adjacent said hand wheel is a sheave or pulley 39 to which is attached and wound thereon a cable 40, said cable extending under a sheave 41 and trained over a sheave 42 with the end of said cable provided with a weight 43. The sheaves 41 and 42 are suitably supported from the bracket 19 so that the weight 43 may freely move and produce a clockwise movement of the shaft 35 causing said shaft, when not otherwise operated, to shift the cam member 25 and restore the carriage 11 to normal position.

The rear end of the shaft 35 is provided with a pinion 44 and a worm gear 46, said worm gear meshing with a worm 45 mounted on a longitudinal shaft 47, journaled in a movable bearing 48 carried by the rear end of the rock shaft 49. The rock shaft 49 is journaled in bearings 50 of the walls 1 and 2 of the lathe body and with said rock shaft disposed transversely of the lathe body. The front end of said shaft has a crank 51 and a lug 52, said crank permitting of the shaft being manually rocked to raise and lower the bearing 48 relative to the worm gear 46, so that the worm 45 may be moved into and out of engagement with the worm gear 46. The lug 52 is normally engaged by a latch 53 pivoted on the front wall 1 of the lathe body, and normally held in engagement with the lug 52 by a coiled retractile spring 54. The latch 53 is limited in its movement by a stop pin 55 of the wall 1 and the upper end of said latch extends into the path of a kick-off member 56 carried by the apron 12 of the carriage 11, as best shown in Fig. 1.

As the bearing 48 is set to one side of the rock shaft 49, it is possible for the bearing to move away from the worm gear 46 by gravity, when the latch 53 is kicked out of engagement with the lug 52. This is automatically accomplished by the carriage 11 when said carriage has performed a duty by moving in one direction under power, and on reaching the limit of its longitudinal movement the power derived from the shaft 47 is cut off relative to the shaft 35, consequently there is a cessation in the operation of the carriage 11 in one direction and the weight 43 is brought into action to move the carriage in an opposite direction or restore it to normal position. The elements 45 to 56 inclusive constitute automatic cut-off means for the power of the lathe as far as the movement of the carriage is concerned, and the mechanism constituting this automatic cut-off means has been simply illustrated as an example of various mechanisms that may be employed for the same purposes.

The shaft 47 is provided with a gear wheel 57 meshing with a gear wheel 58 on one end of a shaft 59, journaled in a bracket 60, carried by the rear wall 2 of the lathe body. The opposite end of the shaft 59 has a large gear wheel 61, which is best shown in Fig. 3, and said large gear wheel meshes with a small gear wheel 62 mounted on a shaft 63 journaled in the bracket 60. The shaft 63 is provided with a sprocket wheel 64 and trained under this sprocket wheel and over a sprocket wheel on the main spindle 17 is an endless sprocket chain 65 by which power is transmitted from the head stock to the shaft 47 when the worm 45 thereof is in engagement with the worm gear 46, such position of the worm 45 retaining the gear wheel 57 in mesh with the gear wheel 58; otherwise the gear wheels 57 and 58 are separated and power movement cannot be transmitted to the carriages of the lathe.

Reference will now be had to the transverse movable tool holder best shown in Figs. 2 and 4 and comprising a longitudinally disposed bracket 66 that is adjustably connected, as at 67, to the rear wall 2 of the lathe body, said bracket affording a longitudinal tongue or slideway 68 for a slide member 69. Mounted on the slide member 69 is an interchangeable cam 70 having a cam groove 71 and extending into said cam groove is the antifrictional roller of a post 72 carried by a tool holder 73, which is somewhat similar to the tool holder 13. The tool holder 73 is slidable transversely of a carriage 74 on the ways of the rear wall 2, and the carriage 74 is normally stationary in contradistinction to the reciprocatory carriage 11. The carriage 74, however, may be adjusted to desired position relative to the rear wall, and this adjustment may be simultaneous with that of the bracket 66, and as a matter of fact, it is possible to connect these two elements for movement together.

To slide the member 69 and produce a transverse movement of the tool holder 73 on the carriage 74, a longitudinally disposed rack arm 75 is adjustably connected to the slide member 69, as at 77, and said rack arm extends through a guide 76, carried by the rear wall 2 of the lathe body. The rack of said rack arm meshes with the pinion 44 of the shaft 35 and since said shaft forms part of the operating mechanism for the reciprocatory carriage 11, it is possible to simultaneously adjust the tool holders 13 and 73 whereby a tool carried by the holder 13 will be shifted in a plane parallel to the axis of a piece of work between the head and tail stocks of the lathe, while the tool carried by the holder 73 will be shifted transversely to the piece of work. It is now apparent that while the periphery of a piece of work is operated upon the end of the same piece of work may be faced or otherwise operated on, thus performing two operations in the one lathe.

The operating principle of the double carriage lathe may be embodied in a lathe, such as shown in Fig. 5, having a set of reciprocatory carriages or tool holders, generally designated 78, connected by a member 79, and a set of transverse movable tool holders 80 may be connected by prolonging the rack arm 75 as a connection between the work holders. The sets of work holders or carriages are simply an instance of a multiplicity of working elements for a single lathe body.

From the foregoing, it will be observed that through the medium of the cam members 25 and 70 and other elements and adjustments about the lathe that the power movements of the holders can be minutely regulated, and to simplify this arrangement, a lathe may be constructed as shown in Fig. 6, wherein the tool holder B is longitudinally reciprocated by a rack arm 81. The arm 8 is adjustably connected to the tool holder 13, as at 82, and the rack of said arm engages a pinion 83 on the transverse shaft 37. This eliminates the elements 19 to 34 inclusive and while the movement of the tool holder may not be as accurate and sensitive, as through the cam mechanism, yet it is ample for certain kinds of work.

While in the drawings there are illustrated the preferred embodiments of my invention, it is to be understood that the structural elements are susceptible to such variations and modifications as fall within the scope of the appended claims.

What I claim is:—

1. A lathe of the type described comprising a body, a longitudinally movable tool holder on said body, a transversely movable tool holder on said body, cam actuated means adapted for simultaneously moving said tool holders into action, gravity means adapted for restoring said tool holders to normal position, and means actuated by one of said tool holders causing the cessation in operation of said cam actuated means.

2. A lathe of the type described comprising a body, a longitudinally movable tool holder on said body, a transversely movable tool holder on said body, cam actuated means adapted for simultaneously moving said tool holders into action, gravity means adapted for restoring said tool holders to normal position, said gravity means being placed in active condition by the movement of the tool holders, and means actuated by the longitudinally movable tool holder adapted to cause a cessation in the operation of said cam operated means.

3. A lathe of the type described comprising a body, a longitudinally movable tool holder on said body, a transversely movable tool holder on said body, cam actuated means adapted for simultaneously moving said tool holders into action, operating means for said cam actuated means, and automatic means controlled by said longitudinally movable tool holder adapted to cause a cessation in the operation of said cam actuated means.

4. A lathe as characterized in claim 3 wherein said automatic means is in the form of a rock shaft supporting a transmission gear.

5. A lathe comprising a body, a carriage reciprocable thereon, an arm connected to said carriage, a horizontal flat reciprocable cam adapted for moving said arm and carriage in one direction, operating means including a rack and pinion for reciprocating said cam, and pivoted means adapted to be released by said carriage to disconnect said operating means relative to said cam.

6. A lathe comprising a body having head and tail stock adapted for holding a piece of work, tool holders movable in plane at a right angle to each other, horizontally disposed flat cams movable in planes at an angle to each other and adapted for moving said tool holder, and power means including pinions and racks adapted for operating said cams in synchronism to cause said tool holders to move into action.

7. A lathe as characterized in claim 6 wherein one of said cams is disposed at the rear wall of the lathe body and the other cam at an end wall thereof.

8. A lathe comprising a body having head and tail stocks for holding a piece of work, a tool holder movable on said lathe body relative to the piece of work, cam actuating means for said tool holder when going into action, power operating means for said cam actuating means, and a tiltable element connecting said power operating means with said cam actuating means.

9. A lathe as characterized as claim 8 wherein additional means actuated by said tool holder is adapted to release said tiltable element to cause a cessation in the operation of said cam actuating means by said power means.

10. A lathe comprising a body having head and tail stocks adapted for holding a piece of work, a tool holder on said body movable at a right angle to the axis of a piece of work, a tool holder on said body movable in a plane parallel with the axis of a piece of work, cams adapted for moving both of said tool holders in action, racks and pinions adapted for actuating said cams and power operating means for said racks and pinions.

11. A lathe as characterized in claim 10 wherein additional means actuated by one of said tool holders controls the operation of said pinions and racks by said power means.

In testimony whereof I affix my signature in the presence of two witnesses.

HANS BAERBALCK.

Witnesses:
CHAS. W. STAUFFIGER,
KARL H. BUTLER.